July 29, 1952  E. E. HAIR, JR  2,604,716
BAIT RIG
Filed Feb. 23, 1951  2 SHEETS—SHEET 1
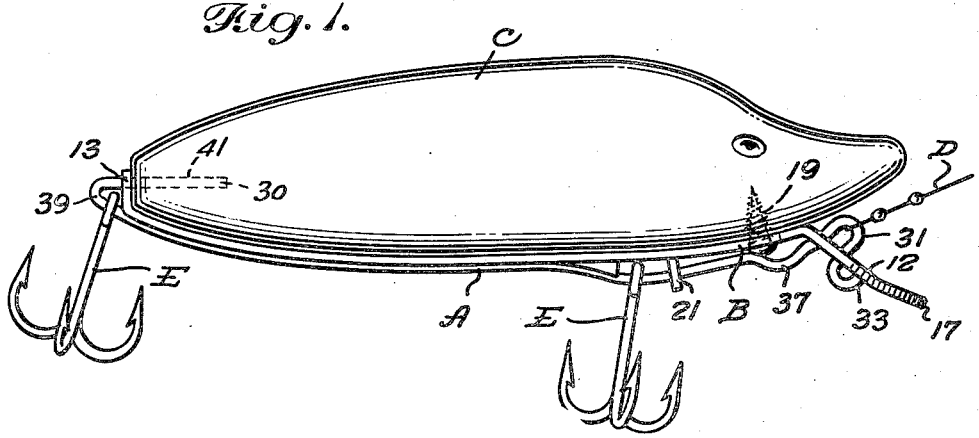
Fig. 1.
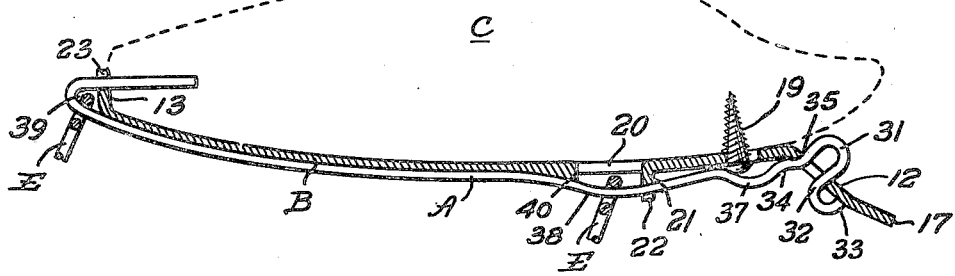
Fig. 2.
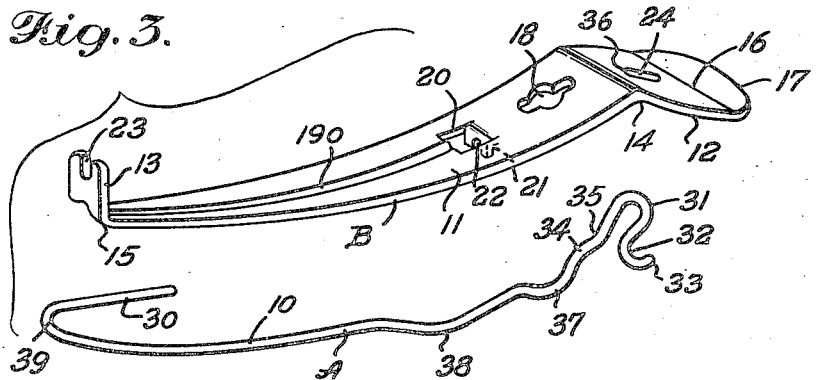
Fig. 3.
Fig. 4.
INVENTOR
Ernest E. Hair, Jr.
BY Munn H. Lane
ATTORNEY July 29, 1952 E. E. HAIR, JR 2,604,716
BAIT RIG
Filed Feb. 23, 1951 2 SHEETS—SHEET 2
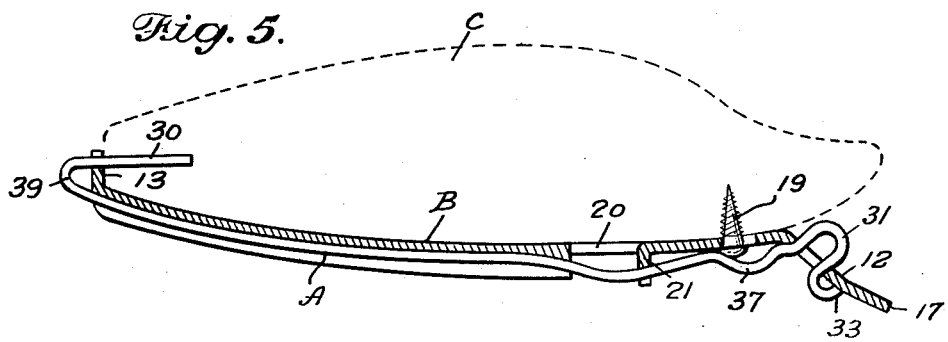
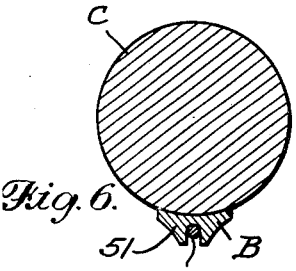
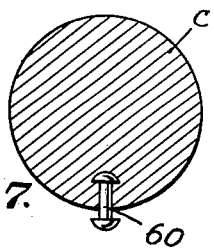
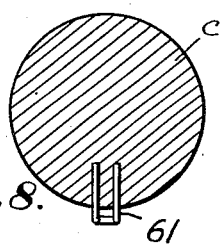
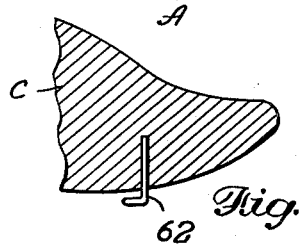
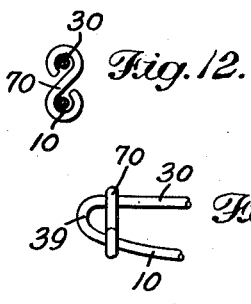
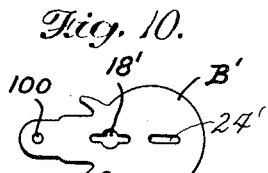
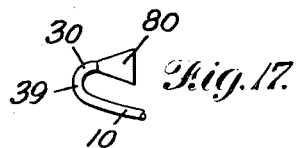
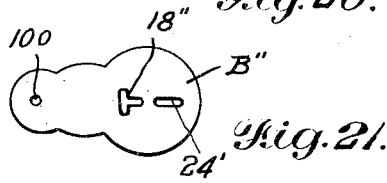
INVENTOR
Ernest E. Hair, Jr.
BY Murrum Hare.
ATTORNEY Patented July 29, 1952

2,604,716

UNITED STATES PATENT OFFICE 2,604,716

BAIT RIG

Ernest E. Hair, Jr., Belton, Tex.

Application February 23, 1951, Serial No. 212,438

4 Claims. (Cl. 43—42.09)

The invention relates to improvements in bait rigs, and more particularly to an improved combination of a readily detachable hook and line attaching means or frame and a spoon member, which combination of elements may be used either alone as a lure or bait or may be used in combination with a conventional body lure or plug.

One of the objects of the invention is to provide a simple and inexpensive lure permitting ready replacement of hooks without the use of tools.

Another object of the invention is to provide a bait rig from which the hooks will not become detached either by accident or by the pull of a fish or a pull on the line once the parts have been assembled.

A further object of the invention is to provide improved means for securing together the hook attaching member and the spoon member.

A further object is to provide an improved bait rig unit comprising separable hook attaching and spoon members, which unit may be used alone or in combination with any suitable body member and which is adapted to be readily attached to such body member.

The invention will be more readily understood by reference to the accompanying drawings and the following detailed description in which various embodiments of the invention are set forth by way of illustration rather than by way of limitation.

In the drawings:

Fig. 1 is a side view showing my improved bait rig used in connection with a conventional plug or lure in the form of a minnow or the like;

Fig. 2 is a longitudinal vertical section through the rig, a plug to which it may be attached being indicated in dotted lines;

Fig. 3 is an exploded view showing the frame and spoon members separated;

Fig. 4 is a central vertical section through plug, spoon and frame members showing a modification in which the spoon member is grooved longitudinally;

Fig. 5 is a view similar to Fig. 2 but showing a modification in which the spoon member is weighted at its rear portion;

Fig. 6 is a vertical transverse section thereof;

Figs. 7 and 8 are transverse vertical sections through a portion of the plug showing the plug equipped with modified attaching device for securing a spoon member thereto;

Fig. 9 is a fragmentary longitudinal section through the front portion of a minnow or plug showing a modified form of spoon attaching device;

Fig. 10 is a bottom view of the same;

Fig. 11 is a fragmentary view showing a modified arrangement for forming the rear hook attaching eye;

Fig. 12 is a sectional view of the same;

Fig. 13 shows a further modification of the rear hook attaching eye forming mechanism;

Fig. 14 is a sectional view of the same;

Fig. 15 is a fragmentary view showing a still further modification of the rear hook holding eye;

Fig. 16 is a section of the modification of the rear hook holding eye shown in Fig. 17;

Fig. 17 is a side elevation fragmentarily showing a still further modification of the rear hook holding eye;

Fig. 18 is a fragmentary view showing a modified form of front hook retaining eye;

Fig. 19 is a similar view showing a further modification;

Fig. 20 is a plan view showing a modified form of spoon; and

Fig. 21 is a similar view showing a further modification of the spoon.

Referring first particularly to Figs. 1, 2 and 3, my improved bait rig comprises essentially two detachable members or parts A and B which, together with suitable hooks and a line, may be used together as a fishing unit or may be attached to a suitable body member C which may be shaped to resemble a minnow or may be of other desired configuration.

The part A may be termed a hook and line attaching member or frame member, while the part B may be termed a spoon member which is adapted to serve as an artificial bait or lure and to this end may be provided with a highly polished surface so that as the combined parts A and B, together with the desired number of hooks, are drawn through the water such combined parts will constitute a complete fishing lure or unit which will serve to attract and catch fish which may be in the vicinity. The parts are readily detachable by the fisherman to permit replacement or substitution of hooks, which may be permanently attached to the frame member A or may be detachable therefrom, but when once assembled the parts A and B will not become accidentally separated and remain as a unit under the pull of even the most active fish.

The frame member A preferably comprises a unitary wire 10 of rather stiff, resilient material, bent in such a manner as to provide means for detachably securing the same to the spoon member B and also to provide suitably arranged loops or eyes for attachment of a line D and of any desired number of hooks E, herein shown as two, though by suitable modification of the bends in the wire a larger number of hooks may be provided for.

The spoon member B is preferably of elongated, streamlined configuration tapering generally from an enlarged head portion toward the tail portion and being preferably formed of sheet metal which is highly polished so as to serve as a lure. The spoon member is suitably bent and slotted and/or grooved or perforated so as to coact with the frame member A to provide hook and line holding means and also locking means for securely holding the parts in assembled position while permitting ready separation of the parts by the fisherman without requiring the use of tools. The spoon member is preferably curved and shaped to conform to the under side of a conventional lure body or plug and is slotted to facilitate attachment thereto by screws or other fastening means. In accordance with the preferred embodiment of the invention the spoon member comprises a base portion 11 having a slight curvature to conform to the under surface of the shaped plug C and having front and rear extensions 12 and 13, respectively, connected to the base member 11 by means of bend lines 14 and 15, the front extension 12 being preferably bent generally downwardly from the line 14 and then forwardly from an outer bend 16. The front 17 of the extension 12 is preferably rounded so as to present a streamlined appearance and to enable the spoon to be moved smoothly through the water. The curvature and bending of the spoon member tends to impart an up and down movement to the bait rig as the same is drawn through the water. The rear extension 13 of the spoon is bent upwardly from the line 15 and is adapted to fit against the flattened rear end of the plug C when the spoon is attached to the body member. An attaching slot 18 is preferably formed in the forward portion of the base member 11 through which a screw 19 or other fastening means may be inserted for securing the spoon B to the plug C.

To provide for ready assembling and disassembling of the members A and B and for securely retaining the same when assembled the spoon member is provided with suitable slots, perforations and/or grooves which are adapted to coact with complementary parts of the frame member A. As shown in Fig. 3 a centrally located slot 190 is provided extending rearwardly from a square opening 20 located at the forward portion of the base member but slightly in rear of the attaching slot 18. The opening 20 is intended to permit attachment of the forward hook E. An integral downwardly extending lug 21 is provided at the forward margin of the opening 20 and may be formed from material stamped from the base portion in cutting the opening 20. The lower edge of the lug 21 is notched or grooved at 22 to provide means coacting with the elongated groove 190 in centering and retaining the frame member A when the parts are assembled. The upwardly bent rear extension 13 is similarly notched or grooved at 23 for a similar purpose.

An important and characteristic feature of my invention is the slot 24 formed at the forward portion 12 of the spoon member B through which a line attaching portion or eye of the frame member A is adapted to be inserted, as indicated in Figs. 1 and 2.

Referring now to the wire frame or hook and line attaching member A or the bait rig, this member as previously described comprises an elongated wire or frame 10 of stiff, resilient material upon which the hooks are adapted to be mounted and which is adapted to be assembled with the spoon member, and when so assembled to extend lengthwise approximately along the center line thereof. The wire 10 is provided with a reversely bent tail portion 30 and with an eye portion 31 at the forward end thereof adapted to extend through the slot 24 of the spoon member, which eye portion in accordance with my invention is provided with a reversely bent locking portion 32 which extends back through the slot 24 while the extreme end 33 of the wire 10 is adapted to engage beneath the downwardly inclined extension 12 of the spoon member B, thereby providing a positive stop against forward movement of the wire 10. The wire is also preferably bent slightly at 34 to provide a shoulder 35 which coacts with the upper edge 36 of the slot 24 in the spoon member to prevent forward movement at this point. The wire frame 10 is also preferably provided with a downward bend at 37 to accommodate the head of the fastening member 19 and is provided with a further downward bend 38 for attachment of the forward hook E. At the rear of the frame an eye 39 is provided for the rear hook E. To assemble the parts A and B the eye 31 of the frame member A is inserted through the slot 24 of the member B with the end 33 of the wire abutting against the under side of the downwardly bent front portion 12 of the spoon member, the hooks having been previously assembled upon the wire 10. The frame member A is centered by means of the slots 190 and 24 together with the notches 22 and 23 in the projections 21 and 13. The hooks E, E previously mounted upon the wire 10 may be readily moved to their respective positions beneath the opening 20 and within the eye member 39, where they are securely retained against further movement in either direction. The front hook E is retained between the downwardly extending lug 21 and shoulders 40 formed in the base portion at the front end of the slot 190. The rear hook E is restrained against forward movement by the rear extension 13 of the spoon member B which provides a retaining abutment or shoulder. The line D is attached to the eye portion 31 of the frame member A which extends through the slot 24.

To disassemble the parts A and B it is only necessary to remove the line D and then push the eye portion 31 downwardly through the slot 24, which can be done easily owing to the resilience of the wire frame, after which the tail portion 30 of the frame member A is readily removed from the notch 23 in the upstanding rear portion 13 of the member B.

Where the bait rig, including members A and B, is to be used with an artificial minnow or plug C the spoon member B is first secured to the under side of the plug by means of the screw 19, with the upstanding rear portion fitting against the rear of the minnow or plug C, after which the member A is applied to the member B as previously described with the reversely bent tail portion 30 projecting through a longitudinal passage 41 formed in the rear of the plug C. Preferably the headed fastening device 19 is supplied with the plug C, the head being spaced outwardly from the body of the plug a sufficient distance so as to permit the spoon member B to be assembled by simply entering the head of the fastening member into the enlarged portion of the slot 18 and then moving the member forwardly or rearwardly so that the head of the fastening device overlies a reduced portion of the slot 18.

Numerous modifications and variations may be resorted to without departing from the spirit of the invention. Thus, the frame member A may be centered in the member B by providing a longitudinal groove 50, as shown in Fig. 4, instead of the slot 190 shown in Fig. 3. If desired the spoon member B may be of heavier construction than that shown in Figs. 1 to 3, and as shown in Figs. 5 and 6 is weighted by means of a rib 51 which is provided with a central groove in the weighted portion. This weighted portion tends to depress the rear end of the lure while the forward portion tends to rise.

Various fastening means for securing the bait rig to a plug or minnow C may be provided in lieu of the headed screw 19 as shown in Figs. 7, 8, 9 and 10. Thus, in Fig. 7 a rivet 60 is employed for this purpose. In Fig. 8 a staple 61 is employed, and in Figs. 9 and 10 a hook 62 is substituted for the screw 19. These latter means readily coact with the slotted opening 18 shown in the spoon member B in Fig. 3.

Figs. 11 to 17 show modifications and variations of the tail portion 30 and eye 39 of the wire frame member A. Thus, in Figs. 11 and 12 the eye 39 is formed with the aid of a separate holding wire 70 bent in the form of a figure 8. In Figs. 13 and 14 the eye 39 is formed with the aid of a plate member 72 having spaced openings through which the portions 10 and 30 of the wire frame are passed prior to forming the other bends in the forward portion of the wire. In Fig. 15 a hook attaching eye 39' is provided by completely looping the wire 10 at the rear portion thereof. In Figs. 16 and 17 the reversely curved tail portion 30 is provided with an enlargement 80 which is adapted to abut against an upstanding rear portion of the plug C or of the spoon B. In these modifications it will be apparent that the hooks E, E will be permanently secured to the wire frame member A during the course of manufacture and are not adapted to be removed therefrom as in the previously described embodiment of the invention. Likewise, these constructions do away with the necessity for the upstanding portion 13 at the rear end of the spoon member A since other means are provided for preventing forward movement of a hook assembly in the eye portion 39. Figs. 18 and 19 show modified means for attaching the front hook E. In Fig. 18 a complete loop 90 is provided. In Fig. 19 a pair of abutments 91 connected by a strap member 92 are strung on wire 10 on either side of a hook attaching bend 93. Figs. 20 and 21 are modifications of the spoon member B. In these modifications the spoon member is flat while the frame member A (not shown) will be bent to conform thereto. In Fig. 20 the slot 24' in the front portion of the spoon member corresponds to the slot 24 shown in Fig. 3 and is adapted to receive an eye portion 31 of a suitable frame member A. The slot 18' is provided for attachment to the bottom of a conventional plug or minnow corresponding to the plug C. An opening 100 is provided to receive an upstanding tail portion of the frame member. The slot 24' and the opening 100 center the frame member and prevent relative movement between the frame member and the spoon member. In Fig. 21 the form of the spoon member B' is slightly different from that shown in Fig. 20 and a different form of attaching slot 18'' is provided.

Further modifications and variations may be resorted to without departing from the spirit of the invention in its broadest aspects.

I claim:

1. A bait rig comprising a spoon member in the form of an elongated strip of sheet material, and a hook and line attaching frame member comprising a resilient wire detachably secured to the front and rear of the said sheet material and having a line attaching eye portion formed at one end thereof, said spoon member being longitudinally slotted adjacent one end thereof to receive said eye portion, and said wire having a reversely curved portion integral with said eye portion, and terminating in a stop member adapted to engage the under side of the spoon member to prevent the frame member from being drawn forwardly through the slot when a line is attached to said line attaching eye member.

2. A bait rig as set forth in claim 1, wherein the frame member is bent to provide hook attaching portions.

3. A bait rig as set forth in claim 1, wherein means are provided for centering the frame member with reference to the spoon member.

4. A bait rig as set forth in claim 1, wherein the spoon is provided with an upturned rear end portion having a notch in the top thereof, and the frame member is provided with a reversely curved tail piece extending through the notch, and forming a hook attaching eye in rear of the upturned end portion.

ERNEST E. HAIR, Jr.

REFERENCES CITED

The following references are of record in the file of this patent:

UNITED STATES PATENTS

| Number | Name | Date |
|---|---|---|
| 1,807,283 | Dick | May 26, 1931 |
| 2,204,552 | Singleton | June 18, 1940 |
| 2,486,626 | Arbogast | Nov. 1, 1949 |